(12) United States Patent
Good et al.

(10) Patent No.: US 10,679,214 B2
(45) Date of Patent: Jun. 9, 2020

(54) METHOD AND SYSTEM FOR ELECTRONIC DISTRIBUTION OF CONTROLLED TOKENS

(71) Applicant: MasterCard International Incorporated, Purchase, NY (US)

(72) Inventors: William J. Good, Dardenne Prairie, MO (US); Joshua Fields, Chesterfield, MO (US); Mark Smelcer, Wentzville, MO (US); Amit Patankar, St. Louis, MO (US); Renee Mirka, North Royalton, OH (US)

(73) Assignee: MASTERCARD INTERNATIONAL INCORPORATION, Purchase, NY (US)

( * ) Notice: Subject to any disclaimer, the term of this patent is extended or adjusted under 35 U.S.C. 154(b) by 422 days.

(21) Appl. No.: 15/065,074

(22) Filed: Mar. 9, 2016

(65) Prior Publication Data
US 2017/0262841 A1  Sep. 14, 2017

(51) Int. Cl.
| | |
|---|---|
| *G06Q 30/00* | (2012.01) |
| *G06Q 20/38* | (2012.01) |
| *H04L 29/06* | (2006.01) |
| *G06Q 20/32* | (2012.01) |
| *G06Q 20/20* | (2012.01) |

(Continued)

(52) U.S. Cl.
CPC ........... *G06Q 20/385* (2013.01); *G06Q 20/02* (2013.01); *G06Q 20/12* (2013.01); *G06Q 20/20* (2013.01);
(Continued)

(58) Field of Classification Search
CPC .............................. G06Q 40/00; G06Q 99/00
(Continued)

(56) References Cited

U.S. PATENT DOCUMENTS 8,682,802 B1 *   3/2014  Kannanari ........... G06Q 20/367
                                                              705/64
2001/0021927 A1   9/2001  Laurent
(Continued)

FOREIGN PATENT DOCUMENTS

JP           2002269279 A       9/2002

OTHER PUBLICATIONS

NPL Search History.*
(Continued)

*Primary Examiner* — John H. Holly
(74) *Attorney, Agent, or Firm* — Buchanan Ingersoll & Rooney PC

(57) ABSTRACT

A method for distributing controlled tokens to a secondary mobile device includes: storing account profiles, each including an account identifier, set of token credentials, and an associated mobile device identifier; receiving a token distribution request from a first mobile device including a first mobile device identifier, recipient mobile device identifier, specific account identifier, and account controls; identifying a specific account profile including the specific account identifier and first mobile device identifier; generating a single use identification value and reservation identifier; transmitting the single use identification value to the first mobile device; transmitting the reservation identifier to a second mobile device associated with the recipient mobile device identifier; receiving the reservation identifier and the single use identification value from the second mobile device; verifying the reservation identifier and single use identification value received from the second mobile device; and transmitting a new set of token credentials to the second mobile device.

18 Claims, 7 Drawing Sheets

(51) Int. Cl.
*G06Q 20/40* (2012.01)
*G06Q 20/36* (2012.01)
*G06Q 20/02* (2012.01)
*G06Q 20/12* (2012.01)
*G06Q 20/34* (2012.01)

(52) U.S. Cl.
CPC ......... *G06Q 20/322* (2013.01); *G06Q 20/325* (2013.01); *G06Q 20/35785* (2013.01); *G06Q 20/36* (2013.01); *G06Q 20/405* (2013.01); *G06Q 20/4012* (2013.01); *H04L 63/062* (2013.01); *H04L 63/0876* (2013.01); *H04L 2463/102* (2013.01)

(58) Field of Classification Search
USPC ......... 705/44, 1.1, 67, 40, 71, 65, 14.65, 21; 726/4, 5, 9, 7, 26; 713/168, 156
See application file for complete search history.

(56) References Cited

U.S. PATENT DOCUMENTS

2001/0032250 A1   10/2001  Kusakabe
2013/0046690 A1*   2/2013  Calman .................. G06Q 40/02
                                                        705/44
2014/0048596 A1    2/2014  Grigg

OTHER PUBLICATIONS

International Search Report and Written Opinion issued by the International Search Authority dated Apr. 28, 2017 in corresponding PCT Application No. PCT/US2017/021024 (14 pages).
Office Action dated Feb. 6, 2020, by the Canadian Intellectual Property Office in corresponding Canadian Patent Application No. 3,017,127. (4 pages).

\* cited by examiner

500

| | |
|---|---|
| Store, in an account database of a processing server, a plurality of account profiles, wherein each account profile is a structured data set related to a transaction account including at least a primary account number, an account identifier, at least one set of token credentials, and, for each set of token credentials, an associated mobile device identifier | 502 |
| Receive, by a receiving device of the processing server, a data signal from a first mobile communication device, wherein the data signal is superimposed with a token distribution request, the token distribution request including at least a first mobile device identifier associated with the first mobile communication device, a recipient mobile device identifier, a specific account identifier, and one or more account controls | 504 |
| Execute, by a querying module of the processing server, a query on the account database to identify a specific account profile where the included account identifier corresponds to the specific account identifier and where an included associated mobile device identifier corresponds to the first mobile device identifier | 506 |
| Generate, by a generation module of the processing server, a single use identification value and a reservation identifier | 508 |
| Electronically transmit, by a transmitting device of the processing server, a data signal to the first mobile communication device, wherein the data signal is superimposed with a reservation notification, the reservation notification including at least the generated single use identification value | 510 |
| Electronically transmit, by the transmitting device of the processing server, a data signal to a second mobile communication device associated with the recipient mobile device identifier, wherein the data signal is superimposed with a token notification, the token notification including at least the generated reservation identifier | 512 |
| Receive, by the receiving device of the processing server, a data signal from the second mobile communication device, wherein the data signal is superimposed with a token verification request, the token verification request including at least the reservation identifier and the single use identification value | 514 |
| Verify, by a verification module of the processing server, that the reservation identifier and single use identification value included in token verification request correspond to the generated single use identification value and reservation identifier | 516 |
| Electronically transmit, by the transmitting device of the processing server, a data signal to the second mobile communication device, wherein the data signal is superimposed with a new set of token credentials associated with the transaction account related to the specific account profile | 518 |

FIG. 5

METHOD AND SYSTEM FOR ELECTRONIC DISTRIBUTION OF CONTROLLED TOKENS

FIELD

The present disclosure relates to the electronic distribution of controlled tokens, specifically the distribution of a duplicate token originally provisioned to a first device to a second device, whereby the duplicate token is subject to controls set by a user of the first device.

BACKGROUND

As people begin to use mobile computing devices more and more in their daily routine, the hardware and software associated with mobile computing devices is developed to be faster, more efficient, and with higher capabilities. One such development for mobile computing devices is the ability to store payment credentials for a transaction account on the mobile device, which can be used in place of a traditional credit card or other payment instrument when conducting a financial transaction. However, the storage of payment credentials directly associated with a transaction account in a mobile computing device can be dangerous, as such devices are highly susceptible to theft both direct (e.g., of the device itself) and indirect (e.g., remote access to the device and its memory). As such, methods for increasing the security of mobile computing devices while maintaining their utility as a payment instrument have been developed.

Once such method involves the use of a payment token in place of traditional payment details. A payment token is an electronic data set that includes credentials that may be used in a payment transaction in place of traditional payment credentials, which is uniquely associated to the mobile computing device to which the token is provisioned. Because the token is directly associated with the mobile computing device, theft of the token may be inconsequential to the user, since the token is unusable if not used in conjunction with the proper mobile computing device. Thus, the use of payment tokens can enable electronic payment transactions involving a mobile computing device with greater security without a sacrifice to efficiency or convenience.

However, the processes for provisioning a token to a mobile computing device often involve complicated authentication processes, to ensure that the user attempting to receive a token for a transaction account is authorized to access and use that transaction account. As a result, this may cause considerable difficulty for individuals that want to enable another to use their transaction account. For instance, a parent that wants to let their child use their transaction account must either let their child borrow their mobile computing device, or must provide their authentication information and other data suitable to have a new payment token generated and provisioned to the child's mobile computing device.

Thus, there is a need for a technical solution where a payment token for a transaction account can be distributed to a secondary mobile computing device, without the need for the secondary mobile computing device having to be fully authenticated using traditional provisioning processes if the secondary mobile device is a trusted device with the account holder. In such a solution, credentials for a transaction account may be shared more easily and efficiently, while still utilizing tokens to provide for greater account security. In addition, the use of a technological solution that also utilizes transaction controls can further ensure that the payment token shared by the account holder is subject to rules set forth by the account holder, to not only prevent fraud of their transaction account, but also misuse by the individual to whom the account was shared.

SUMMARY

The present disclosure provides a description of systems and methods for distributing controlled tokens to a secondary mobile device.

A method for distributing controlled tokens to a secondary mobile device includes: storing, in an account database of a processing server, a plurality of account profiles, wherein each account profile is a structured data set related to a transaction account including at least a primary account number, an account identifier, at least one set of token credentials, and, for each set of token credentials, an associated mobile device identifier; receiving, by a receiving device of the processing server, a data signal from a first mobile communication device, wherein the data signal is superimposed with a token distribution request, the token distribution request including at least a first mobile device identifier associated with the first mobile communication device, a recipient mobile device identifier, a specific account identifier, and one or more account controls; executing, by a querying module of the processing server, a query on the account database to identify a specific account profile where the included account identifier corresponds to the specific account identifier and where an included associated mobile device identifier corresponds to the first mobile device identifier; generating, by a generation module of the processing server, a single use identification value and a reservation identifier; electronically transmitting, by a transmitting device of the processing server, a data signal to the first mobile communication device, wherein the data signal is superimposed with a reservation notification, the reservation notification including at least the generated single use identification value; electronically transmitting, by the transmitting device of the processing server, a data signal to a second mobile communication device associated with the recipient mobile device identifier, wherein the data signal is superimposed with a token notification, the token notification including at least the generated reservation identifier; receiving, by the receiving device of the processing server, a data signal from the second mobile communication device, wherein the data signal is superimposed with a token verification request, the token verification request including at least the reservation identifier and the single use identification value; verifying, by a verification module of the processing server, that the reservation identifier and single use identification value included in token verification request correspond to the generated single use identification value and reservation identifier; and electronically transmitting, by the transmitting device of the processing server, a data signal to the second mobile communication device, wherein the data signal is superimposed with a new set of token credentials associated with the transaction account related to the specific account profile.

A system for distributing controlled tokens to a secondary mobile device includes: a verification module of a processing server; an account database of the processing server configured to store a plurality of account profiles, wherein each account profile is a structured data set related to a transaction account including at least a primary account number, an account identifier, at least one set of token credentials, and, for each set of token credentials, an associated mobile device identifier; a receiving device of the processing server configured to receive a data signal from a first mobile communication device, wherein the data signal is superimposed with a token distribution request, the token distribution request including at least a first mobile device identifier associated with the first mobile communication device, a recipient mobile device identifier, a specific account identifier, and one or more account controls; a querying module of the processing server configured to execute a query on the account database to identify a specific account profile where the included account identifier corresponds to the specific account identifier and where an included associated mobile device identifier corresponds to the first mobile device identifier; a generation module of the processing server configured to generate a single use identification value and a reservation identifier; and a transmitting device of the processing server configured to electronically transmit a data signal to the first mobile communication device, wherein the data signal is superimposed with a reservation notification, the reservation notification including at least the generated single use identification value, and a data signal to a second mobile communication device associated with the recipient mobile device identifier, wherein the data signal is superimposed with a token notification, the token notification including at least the generated reservation identifier. The receiving device of the processing server is further configured to receive a data signal from the second mobile communication device, wherein the data signal is superimposed with a token verification request, the token verification request including at least the reservation identifier and the single use identification value. The verification module of the processing server is configured to verify that the reservation identifier and single use identification value included in token verification request correspond to the generated single use identification value and reservation identifier. The transmitting device of the processing server is further configured to electronically transmit a data signal to the second mobile communication device, wherein the data signal is superimposed with a new set of token credentials associated with the transaction account related to the specific account profile.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIG. 5 is a flow chart illustrating an exemplary method for distributing controlled tokens to a secondary mobile device in accordance with exemplary embodiments.

Figure 1:
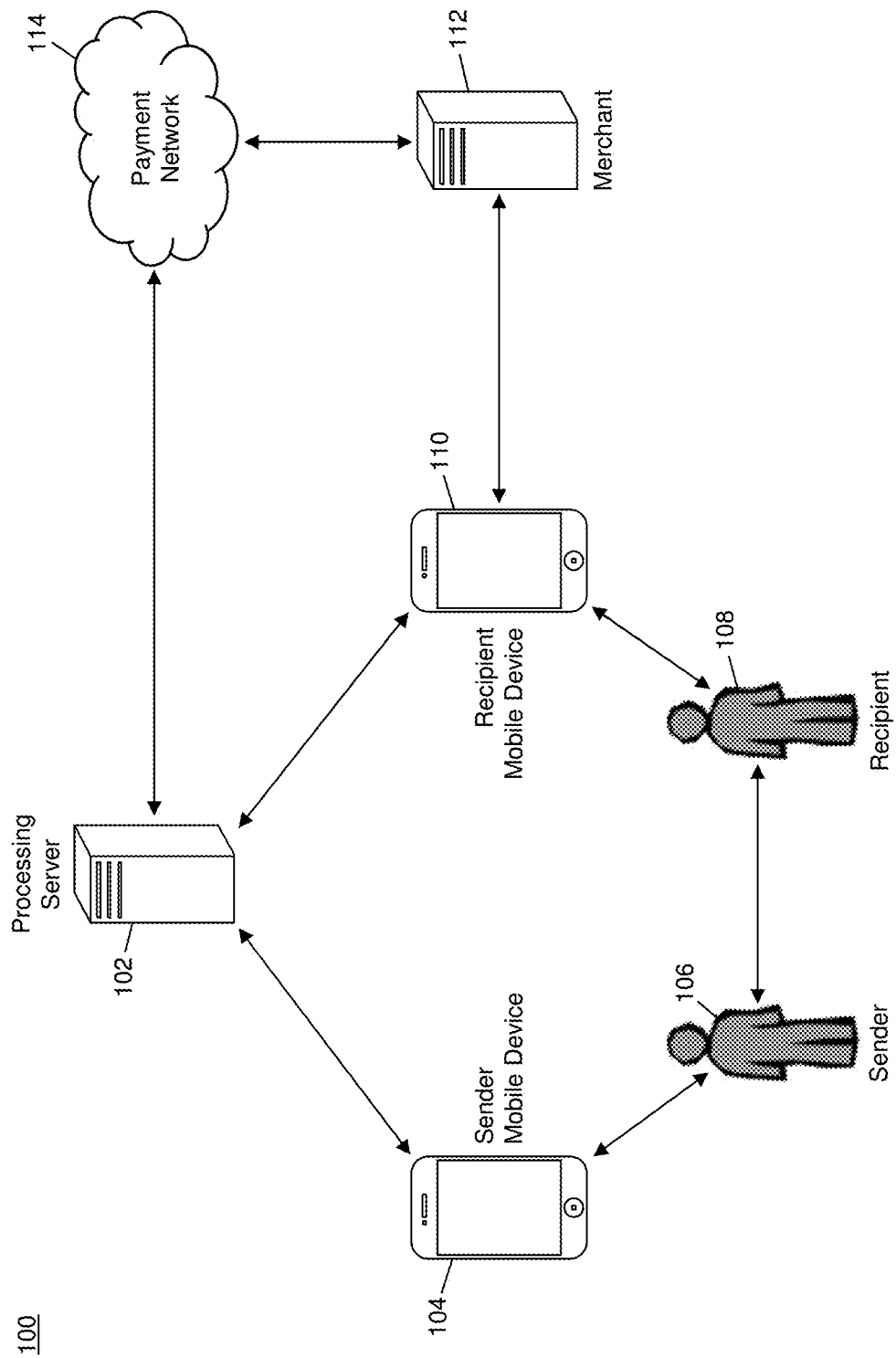
FIG. 1 is a block diagram illustrating a high level system architecture for the electronic distribution of a controlled payment token to a secondary mobile computing device in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Payment Card—A card or data associated with a transaction account that may be provided to a merchant in order to fund a financial transaction via the associated transaction account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated transaction account (e.g., as stored in a communication device, such as a smart phone or computer). For example, in some instances, data including a payment account number may be considered a payment card for the processing of a transaction funded by the associated transaction account. In some instances, a check may be considered a payment card where applicable.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

System for Distribution of Controlled Payment Tokens to Secondary Mobile Devices FIG. 1 illustrates a system 100 for the electronic distribution of a controlled payment token to a secondary mobile device initiated by a primary mobile device already provisioned with a payment token associated with the same transaction account.

The system 100 may include a processing server 102. The processing server 102, discussed in more detail below, may be configured to electronically distribute controlled payment tokens to mobile devices for use in conducting payment transactions. Payment tokens may be associated with a transaction account and may be used in place of traditional payment credentials in an electronic payment transaction conducted at a merchant, where the payment transaction may be processed with the payment token in place of the traditional payment credentials using traditional methods and systems. During the processing of such payment transactions, the associated transaction account may be identified and used for funding of the payment transaction. Payment tokens may be provisioned to a mobile computing device and may be uniquely associated with that mobile computing device. The unique associated with the mobile computing device may be such that the processing of the payment transaction may include identification of the mobile computing device used in the transaction, as well as verification that the payment token presented for use in the transaction is the same payment token provisioned to, and thus uniquely associated with, the mobile computing device.

In the system 100, the processing server 102 may provision a payment token for a transaction account to a sender mobile device 104. The sender mobile device 104, which may also be referred to herein as a "primary" mobile device, may be any type of mobile device suitable for the receipt and usage of payment tokens for use in electronic payment transactions, such as a cellular phone, smart phone, tablet computer, laptop computer, notebook computer, smart phone, wearable computing device, implantable computing device, etc. Methods for provisioning a payment token to a mobile device will be apparent to persons having skill in the relevant art. In some embodiments, the processing server 102 may indicate the payment token provisioned to the sender mobile device 104 to be a "parent" payment token, in that it is the initial payment token provisioned for the transaction account, and that the sender mobile device 104 may be used in the distribution of tokens to secondary devices.

The processing server 102 may store such data in an account database, discussed in more detail below, that may store an account profile related to the transaction account that includes the payment token, its status, and an identifier associated with the sender mobile device 104 to which the payment token is associated. The identifier associated with the sender mobile device 104, referred to herein as a "device identifier," may be any value suitable for use in identification of the sender mobile device 104 and the associated account profile. The device identifier may be, for example, a username, e-mail address, telephone number, identification number, registration number, serial number, media access control address, internet protocol address, etc.

A sender 106 may be a user of the sender mobile device 104. The sender 106 may identify a recipient 108 to which the sender 106 wants to provide access to their transaction account. The sender 106 may identify a recipient mobile device 110, or "secondary" mobile device, associated with the recipient 108 to which a secondary, or "child," payment token may be provisioned that is associated with their transaction account. The sender 106 and/or sender mobile device 104 may obtain a device identifier associated with the recipient mobile device 110. The device identifier may be obtained from the recipient 108, such as by the sender 106 directly asking the recipient 108, or directly from the recipient mobile device 110 by the sender 106 or by an electronic transmission from the recipient mobile device 110 to the sender mobile device 104, such as may be made using a suitable communication network, such as a cellular communication network or the Internet. In instances where the sender 106 may obtain the device identifier associated with the recipient mobile device 110, the sender 106 may input the device identifier into the sender mobile device 104 using an input device. Input devices suitable for use for input into a mobile device may include, for example, a keyboard, mouse, touch screen, microphone, camera, click wheel, scroll wheel, stylus, etc., wireless (WiFi, Bluetooth, near field communication, etc.) or nearly any mechanism capable of inputting the device identifier into the mobile device.

Once the sender mobile device 104 has obtained the device identifier of the recipient mobile device 110 to which the sender 106 wants to distribute a payment token, the sender 106 may initiate the electronic transmission of a data signal from the sender mobile device 104 to the processing server 102 that is superimposed with a token distribution request. The data signal may be electronically transmitted using any suitable communication network, such as a cellular communication network or the Internet. The token distribution request may include at least the device identifier associated with the sender mobile device 104, the device identifier associated with the recipient mobile device 110, and an account identifier. The account identifier may be an identification value associated with the transaction account to which the sender 106 wants to provide the recipient 108 with access. The account identifier may be, for example, the primary account number, an identification number, a name, etc.

In some embodiments, the token distribution request may also include one or more account controls. Account controls may be controls to be associated with the payment token such that payment transactions where the payment token is presented as the funding source are subject to the account controls and must be in compliance with the account controls to be approved. A payment token subject to one or more account controls may be referred to herein as a "controlled token" or "controlled payment token." Account controls may set limits for individual transactions (e.g., a limit on transaction amount, geographic location, merchant, merchant category code, transaction time, transaction date, etc.) or for multiple transactions (e.g., an aggregate transaction amount, transaction frequency, number of transactions, etc.). In some instances, an account control may have multiple criteria, such as a control on the spending limit at a specific merchant over a specific period of time, for example, a limit of $100 spent at a video game retailer each month.

The processing server 102 may receive the token distribution request, and may identify the associated account profile using the sender mobile device's device identifier and the account identifier. The processing server 102 may then generate a single use identification value and a reservation identifier. The single use identification value may be distributed to the sender mobile device 104 from the processing server 102 using a suitable communication method. The single use identification value may be a value suitable to provide additional verification for the provisioning of the payment token to the recipient mobile device 110. The single use identification value may be a unique value, but may also be used in more than one provisioning. In latter instances, the single use identification value may be randomly or pseudo-randomly generated, selected, or otherwise identified such that the value may not be easily guessed or predicted. For example, the single use identification value may be a five-digit number that is randomly or pseudo-randomly generated such that it may not be easily guessed, and may not be singularly unique to the provisioning, but may be suitable for authentication using the methods discussed herein.

The reservation identifier may be distributed to the recipient mobile device 110 by the processing server 102 using a suitable communication method. The reservation identifier may be a value suitable to identify the data exchanges being conducted in conjunction with the distribution of the payment token to the recipient mobile device 110. The reservation identifier may be a unique value such that it is not used in any other data exchanges related to the provisioning of any other payment tokens.

In order to receive the payment token from the processing server 102, the recipient mobile device 110 must electronically transmit a data signal to the processing server 102 using a suitable communication method that is superimposed with both the reservation identifier and the single use identification value. The recipient mobile device 110 may receive the single use identification value using any suitable method. For example, the sender 106 may electronically transmit the single use identification value from the sender mobile device 104 to the recipient mobile device 110, such as via short messaging service (SMS) message, multimedia messaging service (MMS) message, e-mail, an application program, etc. In another example, the sender 106 may communicate the single use identification value directly to the recipient 108, such as by verbally communicating the single use identification value or giving the recipient 108 a physical object (e.g., a piece of paper) on which the single use identification value is written or displayed. In the latter example, the recipient 108 my input the single use identification value into the recipient mobile device 110 using a suitable input device. In an exemplary embodiment, the recipient 108 and recipient mobile device 110 may not receive the single use identification value from the processing server 102, and instead receive it from the sender mobile device 104 or sender 106 using a suitable method such as those mentioned above.

Once the processing server 102 receives the reservation identifier and single use identification value from the recipient mobile device 110, the processing server 102 may verify the accuracy of both values. The verification may include identifying if the reservation identifier and single use identification value supplied by the recipient mobile device 110 are the same as the reservation identifier and single use identification value generated by the processing server 102. If the verification fails (e.g., one or both values are incorrect), then the processing server 102 may electronically transmit a data signal to the recipient mobile device 110 superimposed with a notification that the verification failed. In some instances, the recipient mobile device 110 may be able to retry, such as by resubmitting the values or submitting different values. If the verification passes, the processing server 102 may distribute a new set of token credentials (e.g., a new payment token) associated with the transaction account to the recipient mobile device 110 using a suitable provisioning method. The recipient mobile device 110 may then store the payment token for use in conducting a payment transaction.

The processing server 102 may be configured to store the new payment token and the device identifier associated with the recipient mobile device 110 in the account profile related to the transaction account. In instances where the sender 106 has set controls on the new payment token, the account controls may also be stored in the account profile. In such instances, the processing server 102 may electronically transmit a data signal to the recipient mobile device 110 superimposed with a notification of the account controls to which the new payment token is subject. In some instances, the processing server 102 may indicate in the account profile that the new payment token is a child payment token. The processing server 102 may prohibit a mobile device associated with a child payment token (e.g., the recipient mobile device 110) from requesting the distribution of a new payment token to another mobile device. In such instances, requests for new tokens may only be submitted via mobile devices that were properly authenticated as having access to the related transaction account, such as the sender mobile device 104. As a result, the sender 106 may distribute tokens to recipients 108 for use, without the worry that the recipient 108 will turn around and give others new tokens on their account. In some instances, the sender 106 may specify the status (e.g., parent or child) of the new payment token in the token distribution request.

The recipient mobile device 110 may then be used in a payment transaction. The recipient 108 may take the recipient mobile device 110 to a merchant 112 for use in funding a payment transaction. As part of the transaction process, the recipient mobile device 110 may convey the payment token to the merchant 112. Methods for conveyance of a payment token from a mobile device to a merchant 112 (e.g., via a merchant point of sale system) will be apparent to persons having skill in the relevant art and may include near field communication transmission, display and reading of a machine-readable code, etc.

The merchant 112 may receive the payment token and may submit the payment token along with transaction data for the payment transaction to a payment network 114. The submission may be made via the payment rails, and may be forwarded through, and in some instances modified, adjusted, reformatted, or otherwise changed, by one or more intermediate entities, such as an acquiring financial institution and a gateway processor. The payment network 114 may receive a transaction message for the payment transaction, which may be a specially formatted data message that is formatted pursuant to one or more standards governing the exchange of financial transaction messages, such as the International Organization of Standardization's ISO 8583 standard. The transaction message may include a plurality of data elements including a data element configured to store a primary account number, which may include the payment token provided by the recipient mobile device 110. The payment network 114 may identify the payment token and may forward the transaction message to the processing server 102 via the payment rails.

The processing server 102 may receive the transaction message and may identify the account profile involved in the payment transaction based on the payment token stored in the data element configured to store the primary account number for the transaction. The processing server 102 may then determine if the payment transaction is in compliance with the account controls set for the payment token, such as by comparing data values stored in the data elements in the transaction message with the account controls associated with the payment token. For example, if the account controls include a limit on the transaction amount for a specific merchant and an aggregate spending limit over a period of time, the processing server 102 may determine if the transaction amount for the transaction (e.g. as stored in the corresponding data element) is within the transaction amount limit if the merchant 112 is the specific merchant, and determine if the transaction would result in an aggregate spending amount for the period of time over the limit. The processing server 102 may provide an indication of the success or failure of the determination of compliance to the payment network 114 using the payment rails or a suitable alternative communication network. In some embodiments, the processing server 102 may swap the payment token stored in the corresponding data element for the primary account number associated with the transaction account.

The payment network 114 may receive the indication of the success or failure of the determination of compliance and then may process the payment transactions accordingly using traditional methods. For example, if the processing server 102 determined that the transaction was not in compliance with the account controls, the payment network 114 may deny the transaction. The merchant 112 may be informed of the approval or denial of the payment transaction using traditional methods, and may finalize the transaction with the recipient 108 and recipient mobile device 110 accordingly. Additional information regarding the submission of transaction data from a merchant 112 to a payment network 114 and the processing of transaction messages and payment transactions is discussed in more detail below with respect to the process 600 illustrated in FIG. 6.

The methods and systems discussed herein may enable the provisioning of controlled payment tokens to secondary mobile devices using a more efficient process while still retaining a high level of security and control. The technological improvements of the processing server 102 as discussed herein may ensure that payment tokens are only distributed to intended mobile devices through verification of the requesting device and via dual verification of the receiving device, and may also improve the security of distributed tokens via the use of account controls. The result is a system 100 where the processing server 102 provides for a more useful method for the distribution of payment tokens to a secondary device without sacrificing the security or control granted by the use of payment tokens.

Processing Server

Figure 2:
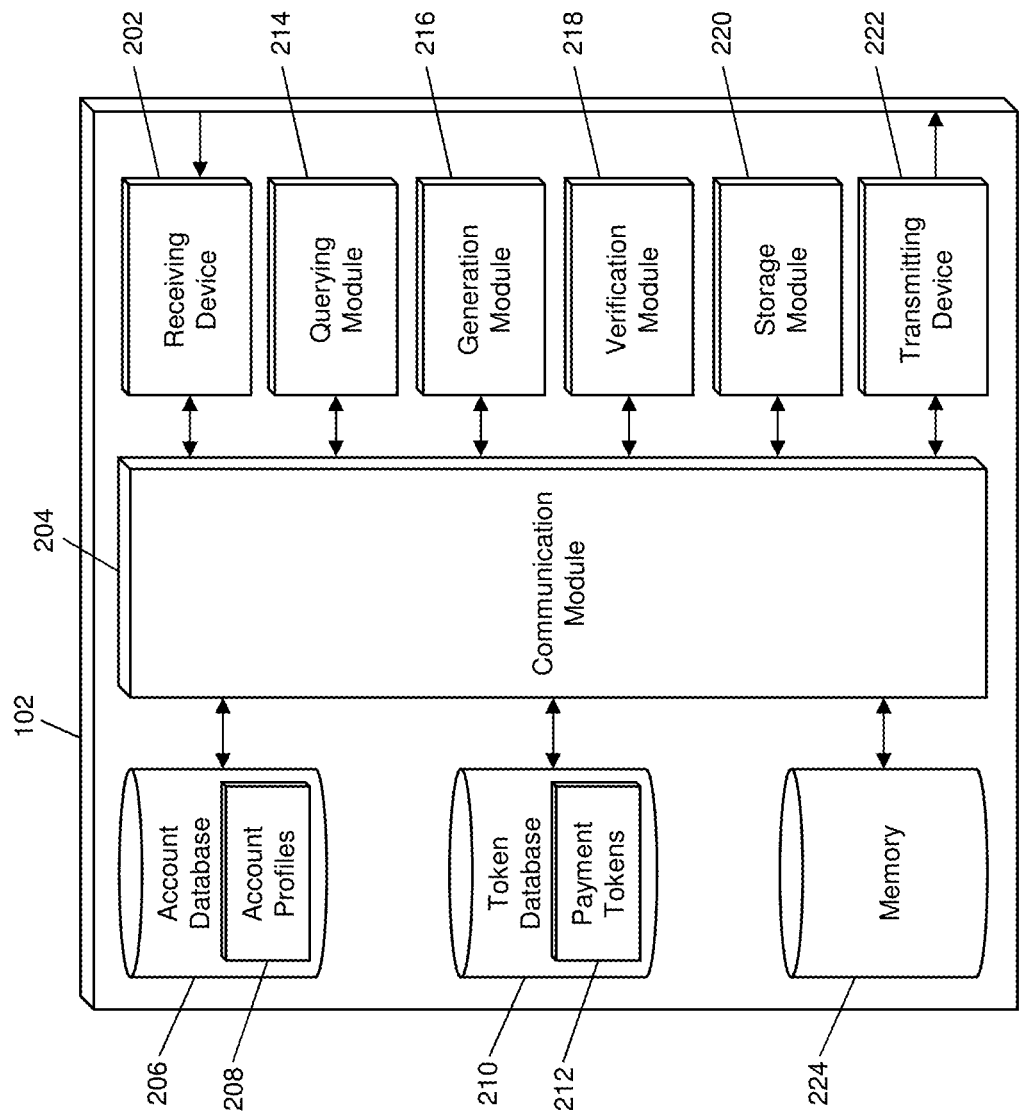
FIG. 2 is a block diagram illustrating the processing server of FIG. 1 for the electronic distribution of controlled payment tokens to secondary mobile computing devices in accordance with exemplary embodiments.

FIG. 2 illustrates an embodiment of the processing server 102 of the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 700 illustrated in FIG. 7 and discussed in more detail below may be a suitable configuration of the processing server 102.

The processing server 102 may include a receiving device 202. The receiving device 202 may be configured to receive data over one or more networks via one or more network protocols. In some embodiments, the receiving device 202 may be configured to receive data over the payment rails, such as using specially configured infrastructure associated with payment networks 114 for the transmission of transaction messages that include sensitive financial data and information. In some instances, the receiving device 202 may also be configured to receive data from sender mobile devices 104, recipient mobile devices 110, payment networks 114, and other entities via alternative networks, such as the Internet. In some embodiments, the receiving device 202 may be comprised of multiple devices, such as different receiving devices for receiving data over different networks, such as a first receiving device for receiving data over payment rails and a second receiving device for receiving data over the Internet. The receiving device 202 may receive electronically data signals that are transmitted, where data may be superimposed on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by the sender mobile device 104, which may be superimposed with token distribution requests. A token distribution request may include at least a device identifier associated with the sender mobile device 104, an account identifier, and a device identifier associated with a recipient mobile device 110. The token distribution request may also include account controls. In some instances, the receiving device 202 may be configured to receive data signals electronically transmitted by the sender mobile device 104 that are superimpose with account controls and/or other data used in the management of parent or child payment tokens for a transaction account to which the sender mobile device 104 is authorized.

The receiving device 202 may also be configured to receive data signals electronically transmitted by the recipient mobile device 110, which may be superimposed with token verification requests. Token verification requests may include at least a device identifier associated with the recipient mobile device 110 and a reservation identifier and single use identification value used to verify the recipient mobile device 110 for provisioning of a child payment token. The receiving device 202 may also be configured to receive transaction messages and other transaction data from payment networks 114, which may be electronically transmitted using the payment rails or other suitable communication networks, for use in the processing of payment transactions where payment tokens provisioned by the processing server 102 are used.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc., as well as being configured to establish communication channels with outside systems and devices, such as the electronic point of sale device 104. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, verification module 218, storage module 220, etc. As used herein, the term "module" may be software or hardware particularly programmed to receive an input, perform one or more processes using the input, and provide an output. The input, output, and processes performed by various modules will be apparent to one skilled in the art based upon the present disclosure.

The processing server 102 may include a memory 224. The memory 224 may be configured to store data for use by the processing server 102 in performing the functions discussed herein. The memory 224 may be configured to store data using suitable data formatting methods and schema and may be any suitable type of memory, such as read-only memory, random access memory, etc. The memory 224 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. The memory 224 may also include or be comprised of a relational database that utilizes structured query language for the storage, identification, modifying, updating, accessing, etc. of structured data sets stored therein.

The processing server 102 may include an account database 206. The account database 206, illustrated in FIG. 3 and discussed in more detail below, may be configured to store a plurality of account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data associated with a transaction account. Each account profile 208 may include, as discussed in more detail below, at least a primary account number associated with the related transaction account, at least one set of token credentials, and, for each set of token credentials, an associated mobile device identifier.

In some embodiments, the processing server 102 may also include a token database 210. The token database 210 may be configured to store a plurality of payment tokens 212 using a suitable data storage format and schema. The token database 210 may be a relational database that utilizes structured query language for the storage, identification, modifying, updating, accessing, etc. of structured data sets stored therein. Each payment token 212 may be a structured data set configured to store payment credentials for a related transaction account suitable for use in funding a payment transaction. In some instances, the token database 210 may include a device identifier for each payment token 212 that has been provisioned to a mobile device. In such instances, an account profile 208 may not include payment tokens, but instead may be associated with the token database 210 whereby payment tokens 212 may be identified using device identifiers stored in the respective account profiles 208.

The processing server 102 may also include a querying module 214. The querying module 214 may be configured to execute queries on databases to identify information. The querying module 214 may receive one or more data values or query strings, and may execute a query string based thereon on an indicated database, such as the account database 206, to identify information stored therein. The querying module 214 may then output the identified information to an appropriate engine or module of the processing server 102 as necessary. The querying module 214 may, for example, execute a query on the account database 206 to identify an account profile 208 associated with a token distribution request received by the receiving device 202. Account profiles 208 may be identified via the data included therein, such as device identifiers, account identifiers, primary account numbers, and payment tokens.

The processing server 102 may also include a generation module 216. The generation module 216 may be configured to generate data suitable for use in performing the functions of the processing server 102 discussed herein. The generation module 216 may receive a data request as input, may generate data based thereon, and may output the generated data to another engine or module of the processing server 102. The generation module 216 may be configured to generate reservation identifiers, which may be unique values generated randomly, pseudo-randomly, or using any suitable generation algorithm. The generation module 216 may also be configured to generate or otherwise identify single use identification values for use in verifying recipient mobile devices 110. In some embodiments, the generation module 216 may be configured to generate payment tokens for provisioning to mobile devices.

The processing server 102 may also include a verification module 218. The verification module 218 may be configured to verify data received via the receiving device 202 for use in performing the functions discussed herein. The verification module 218 may receive data as input, may verify the data, and may output a result of the verification to another module or engine of the processing server 102. In some instances, the verification module may receive two data sets to be verified against one another. In other instances, the verification module may receive a data set and may identify a second data set used in verification. The verification module 218 may be configured to, for example, verify a reservation identifier and single use identification value received from a recipient mobile device 110 with a reservation identifier and single use identification value generated by the generation module 216. The verification module 218 may also be configured to verify compliance of a payment transaction with account controls based on transaction data stored in a received transaction message and account controls stored in a related account profile 208 identified via the querying module 214. In some instances, this may include account controls associated with child payment tokens, parent payment tokens, or transaction accounts generally.

The processing server 102 may also include a storage module 220. The storage module 220 may be configured to generate instructions for the querying module 214 to execute to store data in the databases and memory 224 of the processing server 102. In some instances, the storage module 220 may be configured to generate, format, or otherwise setup data that is to be stored in the databases and memory 224 of the processing server 102. For example, the storage module 220 may be configured to generate new account profiles 208 for sender mobile devices 104 registering with the processing server 102. In another example, the storage module 220 may be configured to generate rules to be stored as account controls in account profiles 208 based on sender requests.

The processing server 102 may also include a transmitting device 222. The transmitting device 222 may be configured to transmit data over one or more networks via one or more network protocols. In some embodiments, the transmitting device 222 may be configured to transmit data over the payment rails, such as using specially configured infrastructure associated with payment networks 114 for the transmission of transaction messages that include sensitive financial data and information, such as identified payment credentials. In some instances, the transmitting device 222 may be configured to transmit data to sender mobile devices 104, recipient mobile devices 110, payment networks 114, and other entities via alternative networks, such as the Internet. In some embodiments, the transmitting device 222 may be comprised of multiple devices, such as different transmitting devices for transmitting data over different networks, such as a first transmitting device for transmitting data over the payment rails and a second transmitting device for transmitting data over the Internet. The transmitting device 222 may electronically transmit data signals that have data superimposed that may be parsed by a receiving computing device. In some instances, the transmitting device 222 may include one or more modules for superimposing, encoding, or otherwise formatting data into data signals suitable for transmission.

The transmitting device 222 may be configured to electronically transmit data signals to sender mobile devices 104 using a suitable communication network, which may be superimposed with data used in performing the functions disclosed herein. For example, the transmitting device 222 may electronically transmit single use identification values to a sender mobile device 104 to be used in provisioning a child payment token to a recipient mobile device 110. The transmitting device 222 may also be configured to electronically transmit data used in the management of an account profile 208 to a sender mobile device 104, such as notifications, preferences, settings, data requests, etc. The transmitting device 222 may also be configured to electronically transmit data signals to recipient mobile devices 110 via a suitable communication network. Data signals transmitted to recipient mobile devices 110 may be superimposed with provisioned payment tokens, account control notifications, reservation identifiers, and other data used in performing the functions discussed herein. The transmitting device 222 may also be configured to electronically transmit data signals to the payment network 114 via the payment rails or suitable alternative communication network, which may be superimposed with transaction messages and/or verification results.

Account Database

Figure 3:
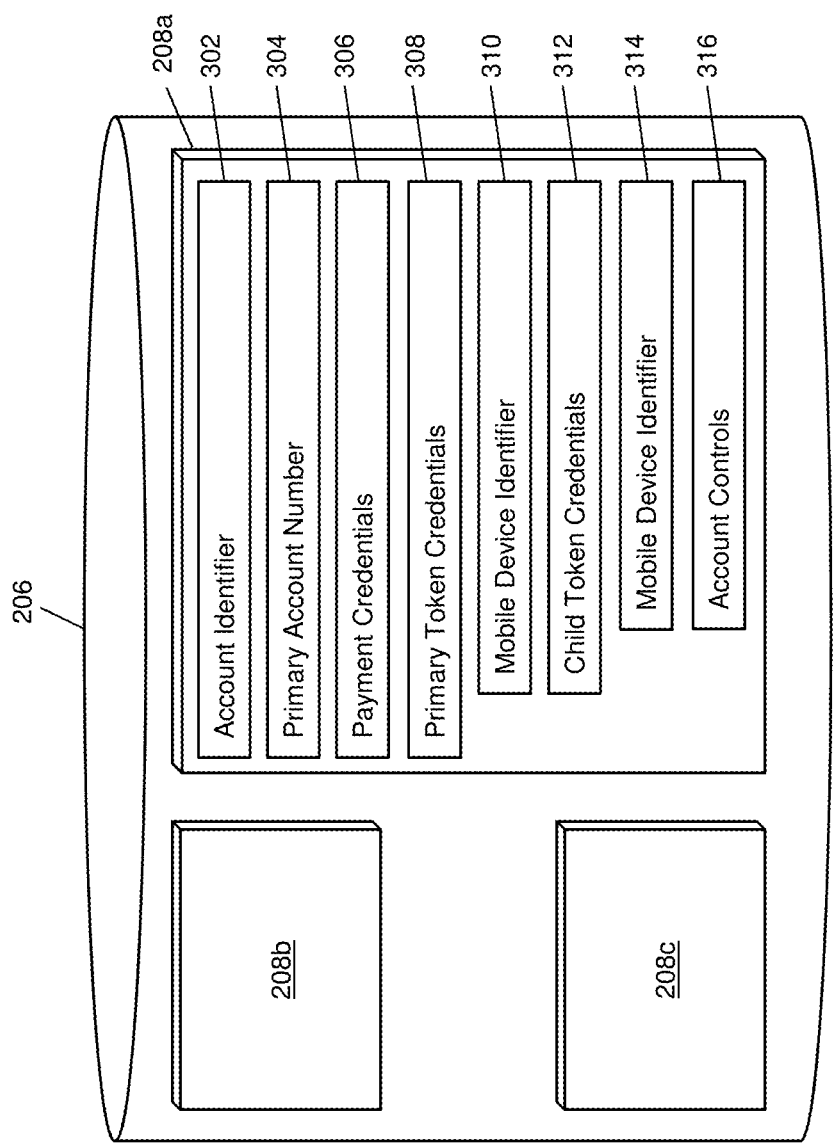
FIG. 3 is a block diagram illustrating the account database of the processing server of FIG. 2 for the storage of account profiles that include token credentials provisioned to primary and secondary mobile computing devices in accordance with exemplary embodiments.

FIG. 3 illustrates the account database 206 stored in the processing server 102 as illustrated in FIG. 2. The account database 206 may be configured to store a plurality of account profiles 208, illustrated in FIG. 3 as account profiles 208a, 208b, and 208c. Each account profile 208 may be a structured data set configured to store data related to a transaction account.

Each account profile 208 may include an account identifier 302. The account identifier 302 may be a unique value suitable for use in identifying the respective account profile 208. An account identifier 302 may be generated by the processing server 102 (e.g., by the generation module 216) using a suitable algorithm and/or process, or may be identified by a user (e.g., the sender 106) associated with the respective account profile 208. For example, the account identifier 302 may be a username, e-mail address, phone number, etc.

Each account profile 208 may also include a primary account number 304. The primary account number 304 may be an account number associated with the related transaction account, and may be used in the processing of payment transactions to be funded by the related transaction account. In some embodiment, an account profile 208 may also include payment credentials 306. The payment credentials 306 may be credentials associated with the related transaction account to be provided in a payment transaction in addition to the primary account number 304. Payment credentials 306 may include, for example, an application transaction counter, one or more payment cryptograms, etc.

Each account profile 208 may also include primary token credentials 308. The primary token credentials 308 may be a parent payment token and any associated credentials suitable for use in the processing of a payment transaction to be funded by the related transaction account. An account profile 208 may further include a mobile device identifier 310 for each set of primary token credentials 308. The mobile device identifier 310 may be a device identifier associated with a mobile device (e.g, the sender mobile device 104) to which the corresponding set of primary token credentials 308 was provisioned. A set of primary token credentials 308 may be for a parent payment token such that the mobile device corresponding to the associated mobile device identifier 310 may be allowed to request distribution of a child payment token to a recipient mobile device 110.

In instances where a child payment token has been provisioned for an account profile 208, the account profile 208 may include at least one set of child token credentials 312. Each set of child token credentials 312 may be for a child payment token provisioned to a recipient mobile device 110 using the methods discussed herein. For each set of child token credentials 312, the account profile 208 may also include an associated mobile device identifier 314, which may be associated with the recipient mobile device 110 to which the respective set of child token credentials 312 was provisioned. A payment token may be a set of child token credentials 312 such that the mobile device corresponding to the associated mobile device identifier 314 may be prohibited from requesting distribution of a subsequent child payment token. In some instances, the account profile 208 may include one or more account controls 316, which may be associated with a single set of child token credentials 312, multiple sets of child token credentials 312, each set of child token credentials 312 associated with a specific set of primary token credentials 308, or all sets of child token credentials 312 included in an account profile 208.

Process for Distributing Payment Tokens to a Secondary Mobile Device

Figure 4:
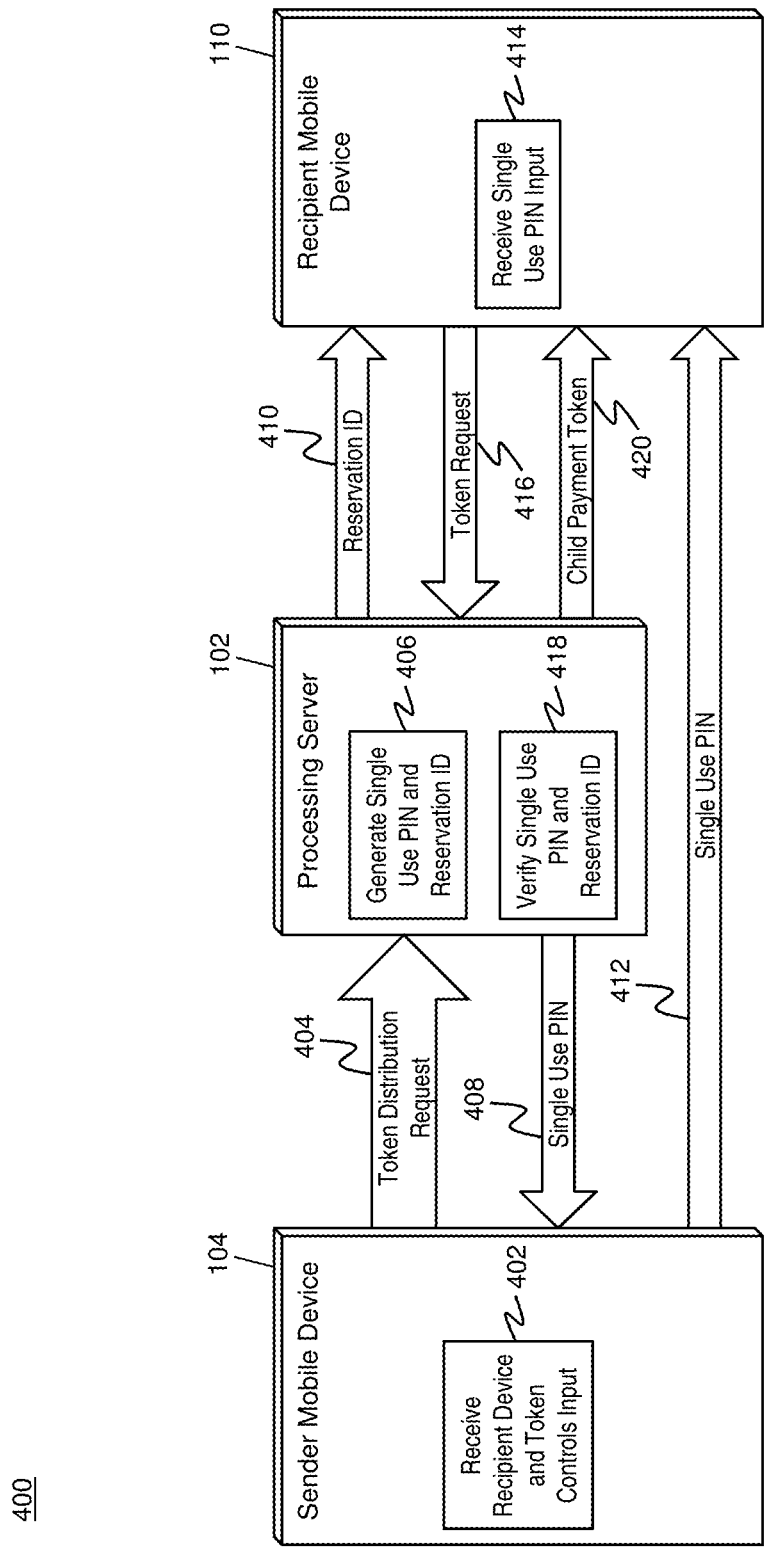
FIG. 4 is a flow diagram illustrating a process for provisioning a controlled payment token to a secondary mobile computing device using the system of FIG. 1 in accordance with exemplary embodiments.

FIG. 4 illustrates a process 400 for the distribution of a child payment token associated with a transaction account to a secondary mobile device as requested by a primary mobile device associated with the transaction account.

In step 402, a sender mobile device 104 may receive input from a user (e.g., the sender 106) of a device identifier for a recipient mobile device 110 and one or more account controls to be set for a child payment token. In some instances, the device identifier for the recipient mobile device 110 may be directly transmitted to the sender mobile device 104 by the recipient mobile device 110 using a suitable communication method and network. In step 404, the data may be included in a token distribution request superimposed on a data signal electronically transmitted by the sender mobile device 104 to the processing server 102 via a suitable communication network. The receiving device 202 of the processing server 102 may receive the token distribution request, which may include the device identifier for the sender mobile device 104, the device identifier for the recipient mobile device 110, and the account controls. In some instances, the token distribution request may also include the account identifier included in the account profile 208 for which a token is to be distributed.

In step 406, the generation module 216 of the processing server 102 may generate a single use personal identification number (PIN) as a single use identification value and a reservation identifier (ID). In step 408, the transmitting device 222 of the processing server 102 may electronically transmit a data signal to the sender mobile device 104 superimposed with the single use PIN. In step 410, the transmitting device 222 of the processing server 102 may electronically transmit a data signal to the recipient mobile device 110 superimposed with the reservation ID. In some instances, the recipient mobile device 110 may be identified via the device identifier included in the token distribution request. In other instances, the token distribution request may include contact information used for communication with the recipient mobile device 110.

In step 412, the sender mobile device 104 may electronically transmit the single use PIN to the recipient mobile device 110 using a suitable communication network and method. For example, the sender mobile device 104 may electronically transmit an SMS message to the recipient mobile device 110 that includes the single use PIN. In some instances, a sender 106 associated with the sender mobile device 104 may communicate the single use PIN to a recipient 108 associated with the recipient mobile device 110. In step 414, the recipient mobile device 110 may receive input of the single use PIN, which may be input via receipt of the single use PIN from the sender mobile device 104 or by the recipient 108 using an input device of the recipient mobile device 110.

In step 416, the recipient mobile device 110 may electronically transmit a data signal to the processing server 102 superimposed with a token request. The token request may include at least the single use PIN, reservation ID, and the device identifier associated with the recipient mobile device 110. In step 418, the verification module 218 of the processing server 102 may verify that the single use PIN and reservation ID supplied by the recipient mobile device 110 are the same as the single use PIN and reservation ID generated by the generation module 216 of the processing server 102 in step 406. If the verification is successful, then, in step 420, the transmitting device 222 of the processing server 102 may electronically transmit a data signal superimposed with a child payment token to the recipient mobile device 110. The recipient mobile device 110 may then use the child payment token in a future payment transaction, which may be subject to the account controls set by the sender mobile device 104. The storage module 220 and querying module 214 may store the child payment token, device identifier associated with the recipient mobile device 110, and account controls in the account profile 208 related to the transaction account.

Exemplary Method for Distributing Controlled Tokens to a Secondary Mobile Device FIG. 5 illustrates a method 500 for the distribution of a controlled payment token associated with a transaction account to a secondary mobile device initiated by a primary mobile device already associated with a payment token associated with the same transaction account.

In step 502, a plurality of account profiles (e.g., account profiles 208) may be stored in an account database (e.g., account database 206) of a processing server (e.g., the processing server 102), wherein each account profile is a structured data set related to a transaction account including at least a primary account number (e.g., primary account number 304), an account identifier (e.g., account identifier 302), at least one set of token credentials (e.g., primary token credentials 308), and, for each set of token credentials, an associated mobile device identifier (e.g., mobile device identifier 310). In step 504, a data signal may be received from a first mobile communication device (e.g., sender mobile device 104) by a receiving device (e.g., the receiving device 202) of the processing server, wherein the data signal is superimposed with a token distribution request, the token distribution request including at least a first mobile device identifier associated with the first mobile communication device, a recipient mobile device identifier, a specific account identifier, and one or more account controls.

In step 506, a query may be executed on the account database by a querying module (e.g., the querying module 214) of the processing server to identify a specific account profile where the included account identifier corresponds to the specific account identifier and where an included associated mobile device identifier corresponds to the first mobile device identifier. In step 508, a single use identification value and a reservation identifier may be generated by a generation module (e.g., the generation module 216) of the processing server.

In step 510, a data signal may be electronically transmitted by a transmitting device (e.g., the transmitting device 222) of the processing server to the first mobile communication device, wherein the data signal is superimposed with a reservation notification, the reservation notification including at least the generated single use identification value. In step 512, a data signal may be electronically transmitted by the transmitting device of the processing server to a second mobile communication device (e.g., recipient mobile device 110) associated with the recipient mobile device identifier, wherein the data signal is superimposed with a token notification, the token notification including at least the generated reservation identifier.

In step 514, the receiving device of the processing server may receive a data signal from the second mobile communication device, wherein the data signal is superimposed with a token verification request, the token verification request including at least the reservation identifier and the single use identification value. In step 516, the reservation identifier and single use identification value included in token verification request may be verified by a verification module (e.g., the verification module 218) of the processing server to correspond to the generated single use identification value and reservation identifier. In step 518, a data signal may be electronically transmitted by the transmitting device of the processing server to the second mobile communication device, wherein the data signal is superimposed with a new set of token credentials (e.g., child token credentials 312) associated with the transaction account related to the specific account profile.

In one embodiment, the method 500 may also include storing, in the specific account profile in the account database, the new set of token credentials and the second mobile device identifier. In a further embodiment, storing the new set of token credentials may further include storing the one or more account controls included in the token distribution request in the specific account profile as associated with the new set of token credentials. In an even further embodiment, a payment transaction where the new set of token credentials is presented for use in authorization of the payment transaction may be subject to the one or more account controls such that the payment transaction is denied if determined to be non-compliant with the one or more account controls based on evaluation of the one or more account controls as applied to transaction data associated with the payment transaction.

In some embodiments, the method 500 may further include generating, by the generation module of the processing server, the new set of token credentials, wherein the new set of token credentials includes payment credentials associated with the transaction account related to the specific account profile and are subject to the one or more account controls included in the token distribution request. In one embodiment, the first mobile device identifier may include at least one of: a phone number, application identifier, username, identification number, media access control address, device fingerprint, e-mail address, personal identification number, and authentication credentials, and the recipient mobile device identifier includes at least one of: a phone number, application identifier, username, e-mail address, and identification number. In some embodiments, the one or more account controls may include a control on at least one of: aggregate spending amount, geographic location, time, date, merchant, merchant category, product, product category, number of transactions, transaction frequency, and ticket size.

In one embodiment, each set of token credentials may further include an associated status indicator, the status indicator indicating the respective set of token credentials as being a parent token or child token. In a further embodiment, a set of token credentials included in the specific account profile associated with the first mobile device identifier may be associated with a status indicator indicating the set of token credentials as being a parent token, and the new set of token credentials may be associated with a status indicator indicating the set of token credentials as being a child token. In another further embodiment, the method 500 may also include verifying, by the verification module of the processing server, that a status indicator associated with a set of token credentials associated with the first mobile device identifier included in the specific account profile indicates the set of token credentials as being a parent token.

Payment Transaction Processing System and Process

Figure 6:
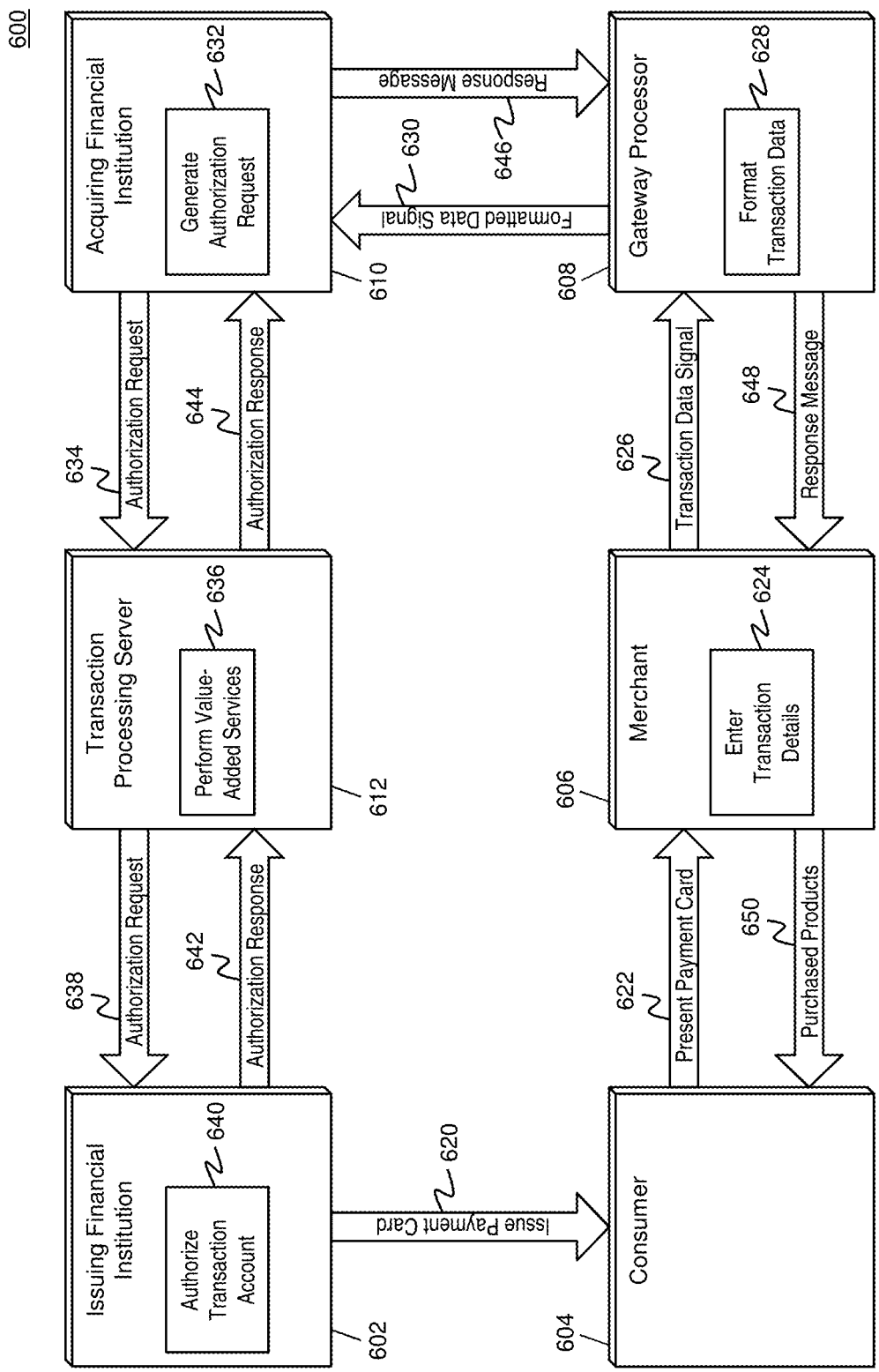
FIG. 6 is a flow diagram illustrating the processing of a payment transaction in accordance with exemplary embodiments.

FIG. 6 illustrates a transaction processing system and a process 600 for the processing of payment transactions in the system. The process 600 and steps included therein may be performed by one or more components of the system 100 discussed above, such as the processing server 102, sender mobile device 104, sender 106, recipient 108, recipient mobile device 110, merchant 112, payment network 114, etc. The processing of payment transactions using the system and process 600 illustrated in FIG. 6 and discussed below may utilize the payment rails, which may be comprised of the computing devices and infrastructure utilized to perform the steps of the process 600 as specially configured and programmed by the entities discussed below, including the transaction processing server 612, which may be associated with one or more payment networks configured to processing payment transactions. It will be apparent to persons having skill in the relevant art that the process 600 may be incorporated into the processes illustrated in FIGS. 4 and 5, discussed above, with respect to the step or steps involved in the processing of a payment transaction. In addition, the entities discussed herein for performing the process 600 may include one or more computing devices or systems configured to perform the functions discussed below. For instance, the merchant 606 may be comprised of one or more point of sale devices, a local communication network, a computing server, and other devices configured to perform the functions discussed below.

In step 620, an issuing financial institution 602 may issue a payment card or other suitable payment instrument to a consumer 604. The issuing financial institution may be a financial institution, such as a bank, or other suitable type of entity that administers and manages payment accounts and/or payment instruments for use with payment accounts that can be used to fund payment transactions. The consumer 604 may have a transaction account with the issuing financial institution 602 for which the issued payment card is associated, such that, when used in a payment transaction, the payment transaction is funded by the associated transaction account. In some embodiments, the payment card may be issued to the consumer 604 physically. In other embodiments, the payment card may be a virtual payment card or otherwise provisioned to the consumer 604 in an electronic format.

In step 622, the consumer 604 may present the issued payment card to a merchant 606 for use in funding a payment transaction. The merchant 606 may be a business, another consumer, or any entity that may engage in a payment transaction with the consumer 604. The payment card may be presented by the consumer 604 via providing the physical card to the merchant 606, electronically transmitting (e.g., via near field communication, wireless transmission, or other suitable electronic transmission type and protocol) payment details for the payment card, or initiating transmission of payment details to the merchant 606 via a third party. The merchant 606 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 624, the merchant 606 may enter transaction details into a point of sale computing system. The transaction details may include the payment details provided by the consumer 604 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 606 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 606 may be an online retailer in an e-commerce transaction. In such embodiments, the transaction details may be entered in a shopping cart or other repository for storing transaction data in an electronic transaction as will be apparent to persons having skill in the relevant art.

In step 626, the merchant 606 may electronically transmit a data signal superimposed with transaction data to a gateway processor 608. The gateway processor 608 may be an entity configured to receive transaction details from a merchant 606 for formatting and transmission to an acquiring financial institution 610. In some instances, a gateway processor 608 may be associated with a plurality of merchants 606 and a plurality of acquiring financial institutions 610. In such instances, the gateway processor 608 may receive transaction details for a plurality of different transactions involving various merchants, which may be forwarded on to appropriate acquiring financial institutions 610. By having relationships with multiple acquiring financial institutions 610 and having the requisite infrastructure to communicate with financial institutions using the payment rails, such as using application programming interfaces associated with the gateway processor 608 or financial institutions used for the submission, receipt, and retrieval of data, a gateway processor 608 may act as an intermediary for a merchant 606 to be able to conduct payment transactions via a single communication channel and format with the gateway processor 608, without having to maintain relationships with multiple acquiring financial institutions 610 and payment processors and the hardware associated thereto. Acquiring financial institutions 610 may be financial institutions, such as banks, or other entities that administers and manages payment accounts and/or payment instruments for use with payment accounts. In some instances, acquiring financial institutions 610 may manage transaction accounts for merchants 606. In some cases, a single financial institution may operate as both an issuing financial institution 602 and an acquiring financial institution 610.

The data signal transmitted from the merchant 606 to the gateway processor 608 may be superimposed with the transaction details for the payment transaction, which may be formatted based on one or more standards. In some embodiments, the standards may be set forth by the gateway processor 608, which may use a unique, proprietary format for the transmission of transaction data to/from the gateway processor 608. In other embodiments, a public standard may be used, such as the International Organization for Standardization's ISO 6663 standard. The standard may indicate the types of data that may be included, the formatting of the data, how the data is to be stored and transmitted, and other criteria for the transmission of the transaction data to the gateway processor 608.

In step 628, the gateway processor 608 may parse the transaction data signal to obtain the transaction data superimposed thereon and may format the transaction data as necessary. The formatting of the transaction data may be performed by the gateway processor 608 based on the proprietary standards of the gateway processor 608 or an acquiring financial institution 610 associated with the payment transaction. The proprietary standards may specify the type of data included in the transaction data and the format for storage and transmission of the data. The acquiring financial institution 610 may be identified by the gateway processor 608 using the transaction data, such as by parsing the transaction data (e.g., deconstructing into data elements) to obtain an account identifier included therein associated with the acquiring financial institution 610. In some instances, the gateway processor 608 may then format the transaction data based on the identified acquiring financial institution 610, such as to comply with standards of formatting specified by the acquiring financial institution 610. In some embodiments, the identified acquiring financial institution 610 may be associated with the merchant 606 involved in the payment transaction, and, in some cases, may manage a transaction account associated with the merchant 606.

In step 630, the gateway processor 608 may electronically transmit a data signal superimposed with the formatted transaction data to the identified acquiring financial institution 610. The acquiring financial institution 610 may receive the data signal and parse the signal to obtain the formatted transaction data superimposed thereon. In step 632, the acquiring financial institution may generate an authorization request for the payment transaction based on the formatted transaction data. The authorization request may be a specially formatted transaction message that is formatted pursuant to one or more standards, such as the ISO 6663 standard and standards set forth by a payment processor used to process the payment transaction, such as a payment network. The authorization request may be a transaction message that includes a message type indicator indicative of an authorization request, which may indicate that the merchant 606 involved in the payment transaction is requesting payment or a promise of payment from the issuing financial institution 602 for the transaction. The authorization request may include a plurality of data elements, each data element being configured to store data as set forth in the associated standards, such as for storing an account number, application cryptogram, transaction amount, issuing financial institution 602 information, etc.

In step 634, the acquiring financial institution 610 may electronically transmit the authorization request to a transaction processing server 612 for processing. The transaction processing server 612 may be comprised of one or more computing devices as part of a payment network configured to process payment transactions. In some embodiments, the authorization request may be transmitted by a transaction processor at the acquiring financial institution 610 or other entity associated with the acquiring financial institution. The transaction processor may be one or more computing devices that include a plurality of communication channels for communication with the transaction processing server 612 for the transmission of transaction messages and other data to and from the transaction processing server 612. In some embodiments, the payment network associated with the transaction processing server 612 may own or operate each transaction processor such that the payment network may maintain control over the communication of transaction messages to and from the transaction processing server 612 for network and informational security.

In step 636, the transaction processing server 612 may perform value-added services for the payment transaction. Value-added services may be services specified by the issuing financial institution 602 that may provide additional value to the issuing financial institution 602 or the consumer 604 in the processing of payment transactions. Value-added services may include, for example, fraud scoring, transaction or account controls, account number mapping, offer redemption, loyalty processing, etc. For instance, when the transaction processing server 612 receives the transaction, a fraud score for the transaction may be calculated based on the data included therein and one or more fraud scoring algorithms and/or engines. In some instances, the transaction processing server 612 may first identify the issuing financial institution 602 associated with the transaction, and then identify any services indicated by the issuing financial institution 602 to be performed. The issuing financial institution 602 may be identified, for example, by data included in a specific data element included in the authorization request, such as an issuer identification number. In another example, the issuing financial institution 602 may be identified by the primary account number stored in the authorization request, such as by using a portion of the primary account number (e.g., a bank identification number) for identification.

In step 638, the transaction processing server 612 may electronically transmit the authorization request to the issuing financial institution 602. In some instances, the authorization request may be modified, or additional data included in or transmitted accompanying the authorization request as a result of the performance of value-added services by the transaction processing server 612. In some embodiments, the authorization request may be transmitted to a transaction processor (e.g., owned or operated by the transaction processing server 612) situated at the issuing financial institution 602 or an entity associated thereof, which may forward the authorization request to the issuing financial institution 602.

In step 640, the issuing financial institution 602 may authorize the transaction account for payment of the payment transaction. The authorization may be based on an available credit amount for the transaction account and the transaction amount for the payment transaction, fraud scores provided by the transaction processing server 612, and other considerations that will be apparent to persons having skill in the relevant art. The issuing financial institution 602 may modify the authorization request to include a response code indicating approval (e.g., or denial if the transaction is to be denied) of the payment transaction. The issuing financial institution 602 may also modify a message type indicator for the transaction message to indicate that the transaction message is changed to be an authorization response. In step 642, the issuing financial institution 602 may transmit (e.g., via a transaction processor) the authorization response to the transaction processing server 612.

In step 644, the transaction processing server 612 may forward the authorization response to the acquiring financial institution 610 (e.g., via a transaction processor). In step 646, the acquiring financial institution may generate a response message indicating approval or denial of the payment transaction as indicated in the response code of the authorization response, and may transmit the response message to the gateway processor 608 using the standards and protocols set forth by the gateway processor 608. In step 648, the gateway processor 608 may forward the response message to the merchant 606 using the appropriate standards and protocols. In step 650, the merchant 606 may then provide the products purchased by the consumer 604 as part of the payment transaction to the consumer 604, assuming the payment transaction is approved.

In some embodiments, once the process 600 has completed, payment from the issuing financial institution 602 to the acquiring financial institution 610 may be performed. In some instances, the payment may be made immediately or within one business day. In other instances, the payment may be made after a period of time, and in response to the submission of a clearing request from the acquiring financial institution 610 to the issuing financial institution 602 via the transaction processing server 612. In such instances, clearing requests for multiple payment transactions may be aggregated into a single clearing request, which may be used by the transaction processing server 612 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 640), the transaction processing server 612 may be configured to perform authorization of transactions on behalf of the issuing financial institution 602. Such actions may be referred to as "stand-in processing," where the transaction processing server "stands in" as the issuing financial institution 602. In such instances, the transaction processing server 612 may utilize rules set forth by the issuing financial institution 602 to determine approval or denial of the payment transaction, and may modify the transaction message accordingly prior to forwarding to the acquiring financial institution 610 in step 644. The transaction processing server 612 may retain data associated with transactions for which the transaction processing server 612 stands in, and may transmit the retained data to the issuing financial institution 602 once communication is reestablished. The issuing financial institution 602 may then process transaction accounts accordingly to accommodate for the time of lost communication.

In another example, if the transaction processing server 612 is unavailable for submission of the authorization request by the acquiring financial institution 610, then the transaction processor at the acquiring financial institution 610 may be configured to perform the processing of the transaction processing server 612 and the issuing financial institution 602. The transaction processor may include rules and data suitable for use in making a determination of approval or denial of the payment transaction based on the data included therein. For instance, the issuing financial institution 602 and/or transaction processing server 612 may set limits on transaction type, transaction amount, etc. that may be stored in the transaction processor and used to determine approval or denial of a payment transaction based thereon. In such instances, the acquiring financial institution 610 may receive an authorization response for the payment transaction even if the transaction processing server 612 is unavailable, ensuring that transactions are processed and no downtime is experienced even in instances where communication is unavailable. In such cases, the transaction processor may store transaction details for the payment transactions, which may be transmitted to the transaction processing server 612 (e.g., and from there to the associated issuing financial institutions 602) once communication is reestablished.

In some embodiments, transaction processors may be configured to include a plurality of different communication channels, which may utilize multiple communication cards and/or devices, to communicate with the transaction processing server 612 for the sending and receiving of transaction messages. For example, a transaction processor may be comprised of multiple computing devices, each having multiple communication ports that are connected to the transaction processing server 612. In such embodiments, the transaction processor may cycle through the communication channels when transmitting transaction messages to the transaction processing server 612, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 610 may identify that an authorization request involves an issuing financial institution 602 (e.g., via the bank identification number included in the transaction message) for which no value-added services are required. The transaction processor at the acquiring financial institution 610 may then transmit the authorization request directly to the transaction processor at the issuing financial institution 602 (e.g., without the authorization request passing through the transaction processing server 612), where the issuing financial institution 602 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 612 for processing.

The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 608, acquiring financial institution 610, etc.) for processing using this advanced network, and to quickly and efficiently receive a response regarding the ability for a consumer 604 to fund the payment transaction.

Computer System Architecture

Figure 7:
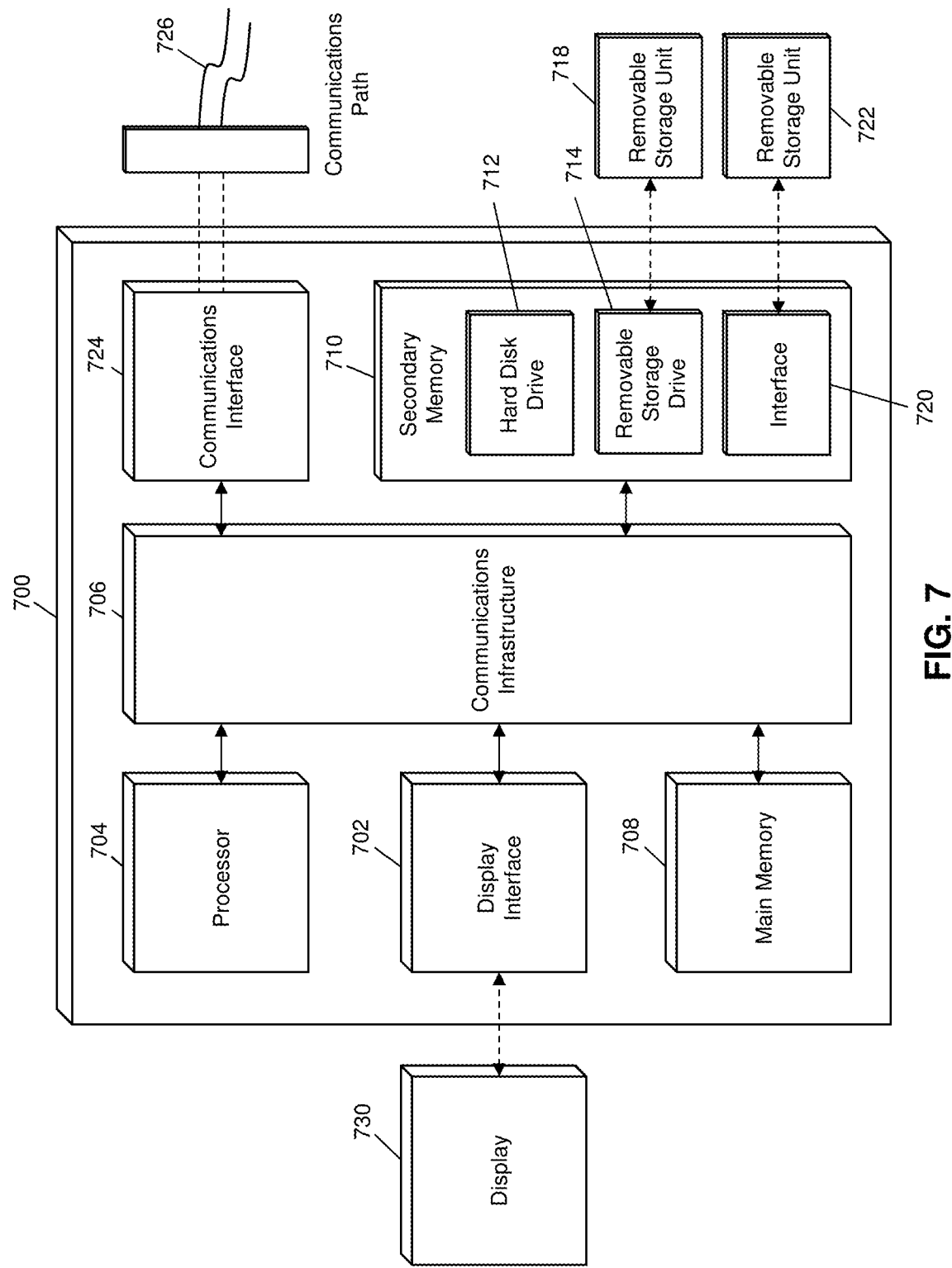
FIG. 7 is a block diagram illustrating a computer system architecture in accordance with exemplary embodiments.

FIG. 7 illustrates a computer system 700 in which embodiments of the present disclosure, or portions thereof, may be implemented as computer-readable code. For example, the processing server 102 of FIG. 1 may be implemented in the computer system 700 using hardware, software, firmware, non-transitory computer readable media having instructions stored thereon, or a combination thereof and may be implemented in one or more computer systems or other processing systems.

Hardware, software, or any combination thereof may embody modules and components used to implement the methods of FIGS. 4-6.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device specifically configured to perform the functions discussed herein. The processor device 704 may be connected to a communications infrastructure 706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive or universal serial bus port, the removable storage unit 718 may be a floppy disk or portable flash drive, respectively. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

The computer system 700 may further include a display interface 702. The display interface 702 may be configured to allow data to be transferred between the computer system 700 and external display 730. Exemplary display interfaces 702 may include high-definition multimedia interface (HDMI), digital visual interface (DVI), video graphics array (VGA), etc. The display 730 may be any suitable type of display for displaying data transmitted via the display interface 702 of the computer system 700, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 708 and secondary memory 710, which may be memory semiconductors (e.g., DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 4-6, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

The processor device 704 may comprise one or more modules or engines configured to perform the functions of the computer system 700. Each of the modules or engines may be implemented using hardware and, in some instances, may also utilize software, such as corresponding to program code and/or programs stored in the main memory 708 or secondary memory 710. In such instances, program code may be compiled by the processor device 704 (e.g., by a compiling module or engine) prior to execution by the hardware of the computer system 700. For example, the program code may be source code written in a programming language that is translated into a lower level language, such as assembly language or machine code, for execution by the processor device 704 and/or any additional hardware components of the computer system 700. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 700 to perform the functions disclosed herein. It will be apparent to persons having skill in the relevant art that such processes result in the computer system 700 being a specially configured computer system 700 uniquely programmed to perform the functions discussed above.

Techniques consistent with the present disclosure provide, among other features, systems and methods for distributing controlled tokens to a secondary mobile device. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for improving the security of controlled tokens transferred from a primary mobile device to a secondary mobile device without reducing security and maintaining a high level of protection against fraud, comprising:
   storing, in an account database of a processing server, a plurality of account profiles, wherein each account profile is a structured data set related to a transaction account including at least a primary account number, an account identifier, at least one set of token credentials, and, for each set of token credentials, an associated mobile device identifier, where each set of token credentials is suitable for use as an account number in a payment transaction processed via a payment network;
   receiving, by a receiving device of the processing server, a data signal from a first mobile communication device, wherein the data signal is superimposed with a token distribution request, the token distribution request including at least a first mobile device identifier associated with the first mobile communication device, a recipient mobile device identifier, a specific account identifier, and one or more account controls;
   executing, by a querying module of the processing server, a query on the account database to identify a specific account profile where the included account identifier corresponds to the specific account identifier and where an included associated mobile device identifier corresponds to the first mobile device identifier;
   generating, by a generation module of the processing server, a single use identification value and a reservation identifier;
   electronically transmitting, by a transmitting device of the processing server, a data signal to the first mobile communication device, wherein the data signal is superimposed with a reservation notification, the reservation notification including at least the generated single use identification value;
   electronically transmitting, by the transmitting device of the processing server, a data signal to a second mobile communication device associated with the recipient mobile device identifier, wherein the data signal is superimposed with a token notification, the token notification including at least the generated reservation identifier;

receiving, by the receiving device of the processing server, a data signal from the second mobile communication device, wherein the data signal is superimposed with a token verification request, the token verification request including at least the reservation identifier and the single use identification value;

verifying, by a verification module of the processing server, that the reservation identifier and single use identification value included in token verification request correspond to the generated single use identification value and reservation identifier;

generating, by the generation module of the processing server, a new set of token credentials, wherein the new set of token credentials includes payment credentials associated with the transaction account related to the specific account profile and are subject to the one or more account controls included in the token distribution request; and electronically transmitting, by the transmitting device of the processing server, a data signal to the second mobile communication device upon successful verification, wherein the data signal is superimposed with the new set of token credentials associated with the transaction account related to the specific account profile.

2. The method of claim 1, further comprising:
storing, in the specific account profile in the account database, the new set of token credentials and the second mobile device identifier.

3. The method of claim 2, wherein storing the new set of token credentials further includes storing the one or more account controls included in the token distribution request in the specific account profile as associated with the new set of token credentials.

4. The method of claim 3, wherein a payment transaction where the new set of token credentials is presented for use in authorization of the payment transaction is subject to the one or more account controls such that the payment transaction is denied if determined to be non-compliant with the one or more account controls based on evaluation of the one or more account controls as applied to transaction data associated with the payment transaction.

5. The method of claim 1, wherein each set of token credentials further includes an associated status indicator, the status indicator indicating the respective set of token credentials as being a parent token or child token.

6. The method of claim 5, wherein
a set of token credentials included in the specific account profile associated with the first mobile device identifier is associated with a status indicator indicating the set of token credentials as being a parent token, and
the new set of token credentials is associated with a status indicator indicating the set of token credentials as being a child token.

7. The method of claim 5, further comprising:
verifying, by the verification module of the processing server, that a status indicator associated with a set of token credentials associated with the first mobile device identifier included in the specific account profile indicates the set of token credentials as being a parent token.

8. The method of claim 1, wherein
the first mobile device identifier includes at least one of: a phone number, application identifier, username, identification number, media access control address, device fingerprint, e-mail address, personal identification number, and authentication credentials, and the recipient mobile device identifier includes at least one of: a phone number, application identifier, username, e-mail address, and identification number.

9. The method of claim 1, wherein the one or more account controls includes a control on at least one of: aggregate spending amount, geographic location, time, date, merchant, merchant category, product, product category, number of transactions, transaction frequency, and ticket size.

10. A system for improving the security of controlled tokens transferred from a primary mobile device to a secondary mobile device without reducing security and maintaining a high level of protection against fraud, comprising:
a verification module of a processing server;
an account database of the processing server configured to store a plurality of account profiles, wherein each account profile is a structured data set related to a transaction account including at least a primary account number, an account identifier, at least one set of token credentials, and, for each set of token credentials, an associated mobile device identifier, where each set of token credentials is suitable for use as an account number in a payment transaction processed via a payment network;
a receiving device of the processing server configured to receive a data signal from a first mobile communication device, wherein the data signal is superimposed with a token distribution request, the token distribution request including at least a first mobile device identifier associated with the first mobile communication device, a recipient mobile device identifier, a specific account identifier, and one or more account controls;
a querying module of the processing server configured to execute a query on the account database to identify a specific account profile where the included account identifier corresponds to the specific account identifier and where an included associated mobile device identifier corresponds to the first mobile device identifier;
a generation module of the processing server configured to generate a single use identification value and a reservation identifier and a new set of token credentials, wherein the new set of token credentials includes payment credentials associated with the transaction account related to the specific account profile and are subject to the one or more account controls included in the token distribution request; and
a transmitting device of the processing server configured to electronically transmit
a data signal to the first mobile communication device, wherein the data signal is superimposed with a reservation notification, the reservation notification including at least the generated single use identification value, and
a data signal to a second mobile communication device associated with the recipient mobile device identifier, wherein the data signal is superimposed with a token notification, the token notification including at least the generated reservation identifier, wherein
the receiving device of the processing server is further configured to receive a data signal from the second mobile communication device, wherein the data signal is superimposed with a token verification request, the token verification request including at least the reservation identifier and the single use identification value, the verification module of the processing server is configured to verify that the reservation identifier and single use identification value included in token verification request correspond to the generated single use identification value and reservation identifier, and the transmitting device of the processing server is further configured to electronically transmit a data signal to the second mobile communication device upon successful verification, wherein the data signal is superimposed with the new set of token credentials associated with the transaction account related to the specific account profile.

11. The system of claim 10, further comprising:
a storage module of the processing server configured to store, in the specific account profile in the account database, the new set of token credentials and the second mobile device identifier.

12. The system of claim 11, wherein storing the new set of token credentials further includes storing the one or more account controls included in the token distribution request in the specific account profile as associated with the new set of token credentials.

13. The system of claim 12, wherein a payment transaction where the new set of token credentials is presented for use in authorization of the payment transaction is subject to the one or more account controls such that the payment transaction is denied if determined to be non-compliant with the one or more account controls based on evaluation of the one or more account controls as applied to transaction data associated with the payment transaction.

14. The system of claim 10, wherein each set of token credentials further includes an associated status indicator, the status indicator indicating the respective set of token credentials as being a parent token or child token.

15. The system of claim 14, wherein
a set of token credentials included in the specific account profile associated with the first mobile device identifier is associated with a status indicator indicating the set of token credentials as being a parent token, and
the new set of token credentials is associated with a status indicator indicating the set of token credentials as being a child token.

16. The system of claim 14, wherein the verification module of the processing server is further configured to verify that a status indicator associated with a set of token credentials associated with the first mobile device identifier included in the specific account profile indicates the set of token credentials as being a parent token.

17. The system of claim 10, wherein
the first mobile device identifier includes at least one of: a phone number, application identifier, username, identification number, media access control address, device fingerprint, e-mail address, personal identification number, and authentication credentials, and
the recipient mobile device identifier includes at least one of: a phone number, application identifier, username, e-mail address, and identification number.

18. The system of claim 10, wherein the one or more account controls includes a control on at least one of: spending amount, aggregate spending amount, geographic location, time, date, merchant, merchant category, product, product category, number of transactions, transaction frequency, and ticket size.

\* \* \* \* \*